April 27, 1965 J. F. VAN OORT 3,180,943
MEANS FOR MAINTAINING SPACING OF A MAGNETIC TRANSDUCER FROM A ROTARY MAGNETIC DRUM
Filed Feb. 24, 1961
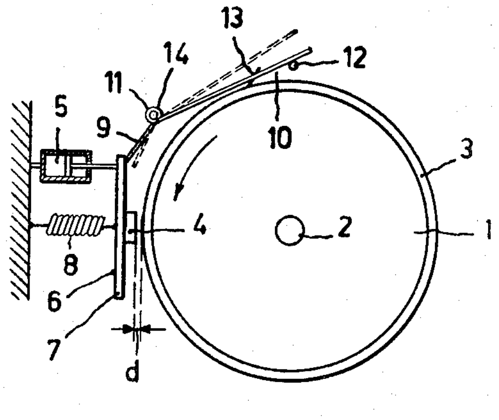
INVENTOR
JOHANNES F. VAN OORT.
BY
Frank R. Trifari
AGENT United States Patent Office 3,180,943
Patented Apr. 27, 1965

3,180,943

MEANS FOR MAINTAINING SPACING OF A MAGNETIC TRANSDUCER FROM A ROTARY MAGNETIC DRUM

Johannes Franciscus Van Oort, Eindhoven, Netherlands, assignor to North American Philips Company, Inc., New York, N.Y., a corporation of Delaware Filed Feb. 24, 1961, Ser. No. 91,368
Claims priority, application Netherlands, Mar. 7, 1960, 249,159
7 Claims. (Cl. 179—100.2)

The invention relates to a device for use in combination with a rotary magnetic storage drum on which information is recorded or scanned with the aid of a recording or reproducing head. More particularly, the invention relates to such a device in which the head floats on a thin layer of a gaseous or liquid medium at a small distance from the drum, means being provided for preventing the head from coming into contact with the drum when the thickness of the layer of the transport medium decreases or the layer is not present. Such magnetic storage drums are frequently used, for example for recording one or more television frames in order to examine the quality of the picture, in certain computers or in the field of radiology.

For recording the very high frequencies (of the order of a few mc./s.) found in the television signal the drum must rotate at great speed (for example at a peripheral speed of 25 m./sec.). In this case the head may float on a film layer of air induced by the wheel owing to its great speed. When used in computers the storage drum generally need not rotate at so high a speed so that no air stream is automatically produced. In this case the head is made to float on a thin layer of air directed by an air pump to a number of orifices in the head. In some cases it may be desirable to use a transport medium other than air, for example rare gases, nitrogen or gaseous chemical compounds, or a medium having a much higher viscosity, for example oil. Depending on the speed at which the drum must rotate, the layer on which the head floats may either be induced by the rotating drum itself or be produced by a compression pump.

In all these cases the transport medium produces a force component in the radial direction which pushes the head away from the drum. A constant spacing between the head and the drum is maintained by a spring which exerts on the head a force directed towards the drum. It will be appreciated that if the centripetal component produced by the layer is not present or is decreasing, for example owing to the fact that the drum is being started or stopped or that the compression pump fails, the head is pushed to the drum by the force of the spring. Devices for preventing this are known which comprise a circuit including a relay; the core of the relay is hinged to the head. Such a device, which is partly electrical and partly mechanical, has a limitation in that it is comparatively complicated and also requires a direct-current source for energising the relay, which source is likely to be discharged at the critical instant. If the relay is energised by an alternating current source associated with a rectifier, the device becomes even more complicated.

By means of the device according to the invention the desired aim can be achieved in a simpler manner in that the means preventing the head from engaging the drum are entirely mechanical.

According to a further feature of the invention, means are provided which comprise a lever which is adapted to pivot about a spindle extending parallel to the shaft of the drum, the lever being arranged so as to exert pressure on the head or head holder when the thickness of the layer of transport medium is insufficient for supporting the head; when said thickness is sufficient, the medium causes the lever to pivot. Such means are simpler from a constructional point of view than the prior art devices and have also proved to be more reliable.

In order to enable the lever to be readily pivoted under the action of the centripetal force of the transport medium, one of the arms of the lever is widened. This is preferably the arm furthest from the lever portion coming into contact with the head or head holder. In addition to being widened this arm may be provided with a vane.

The invention will now be described more fully with reference to an embodiment thereof given by way of example in the accompanying figure.

In the figure, a magnetic storage drum 1 is capable of revolving on a shaft 2. A magnetic layer 3 is provided on the periphery of the drum and a head 4 is arranged near the drum.

The construction chosen is such that when the drum rotates at the correct speed the head "floats on air." For this purpose the head 4 is secured to an arm 6 pivoting about a point 7. The air following the rotation of the drum pushes the head away therefrom against the pressure of a spring 8 and maintains a certain spacing between the head and the revolving drum ("head floating on air"). It has been found experimentally, by optical means, namely by projecting a light beam through the gap, that the spacing $d$ may not exceed $1/\mu$ in most cases. An oil damper 5 safeguards the head against vibration without preventing it from following slow variations (due to changes in temperature).

It will be appreciated that means must be provided to prevent the spring 8 from pushing the head to the drum when the latter is stationary or is rotating at too low a speed or is decreasing in speed. For this purpose provision is made of a lever 9–10 having a pivot point 11. When the drum rotates at too low a speed the lever is in the position shown by full lines: the arm 10 of the lever bears on a pin 12 and the arm 9 of the lever retains the arm 6 thus preventing the head from engaging the drum. When the wheel runs up to full speed, the air carried along pushes aside a vane 13 secured to the arm 10, the lever 9–10 assumes the position shown by broken lines, the arm 9 releases the arm 6 and the above-mentioned equilibrium between the force of the spring 8 and the force exerted by the revolving air film on the head 2 is established.

When the drum is stopped, at the instant immediately preceding the instant at which the force of the spring 8 begins to overcome the radial component of the air carried along, the restoring moment of a torsion spring 14 provided in the pivot point 11 returns the lever to the position shown in full lines so that the head holder 6 is again retained and is prevented from engaging the drum.

While a specific embodiment of the invention has been shown and described, it is apparent that various changes may be made therein without departing from the essence of the inventive concept, the scope of which is set forth in the appended claims.

What is claimed is:

1. Recording and reproducing apparatus comprising in combination: a rotary magnetic storage drum, a magnetic transducer magnetically coacting with the surface of said drum, means for supporting said transducer, bias means urging said transducer towards the drum surface, a lever having two arms, one of said arms floating on said fluid medium when said drum is rotating and maintaining the other of said arms disengaged from said transducer and said supporting means and allowing said transducer to float on a fluid medium adjacent to said drum, means for urging said one arm toward the drum surface, said one arm maintaining said other arm in a position engaging said supporting means and retaining said transducer in a position away from the surface of the drum against the urging of said bias means in response to a decrease in the thickness of the fluid medium.

2. Apparatus as recited in claim 1, wherein a vane is attached to said one arm, said vane coacting with and being responsive to the flow of said fluid medium.

3. Recording and reproducing apparatus comprising in combination: a rotary magnetic storage drum adapted to rotate about a shaft, a magnetic transducer magnetically coacting with the surface of said drum, means for supporting said transducer, bias means urging said transducer towards the drum surface, a spindle extending parallel to said shaft, a lever having two arms, said arms being torsionally pivoted about said spindle, one of said arms floating on said fluid medium when said drum is rotating and maintaining the other of said arms disengaged from said transducer and said supporting means and allowing said transducer to float on a fluid medium adjacent to said drum, said one arm maintaining said other arm in a position engaging said supporting means and maintaining said transducer in a position away from the surface of the drum when the lever is pivoted in response to a decrease in the thickness of said fluid medium.

4. Apparatus as recited in claim 3, further including a vane attached to said one arm, said vane coacting with and being responsive to the flow of said fluid medium.

5. Recording and reproducing apparatus comprising in combination: a rotary magnetic storage drum adapted to rotate about a shaft, a magnetic transducer magnetically coacting with the surface of said drum, support means for supporting said transducer, bias means urging said transducer towards the drum surface, a spindle extending parallel to said shaft, a lever having two arms, said arms being torsionally pivoted about said spindle, one of said arms floating on said fluid medium when said drum is rotating and maintaining the other of said arms disengaged from said transducer and said support means and allowing said transducer to float on a fluid medium adjacent to said drum, said one arm maintaining the other of said arms in a position engaging said support means and retaining the transducer in a position away from the surface of said drum when the lever is pivoted in response to a decrease in the thickness of said fluid medium.

6. Recording and reproducing apparatus comprising in combination: a rotary magnetic storage drum adapted to rotate about a shaft, a magnetic transducer magnetically coacting with the surface of said drum, support means for supporting said transducer, bias means for urging said transducer against the surface of said drum, a spindle extending parallel to said shaft, a lever having two arms, said arms being torsionally pivoted about said spindle, a pin fixed in position adjacent to and between one of said arms and said drum, said one arm floating on said fluid medium when said drum is rotating and resting against said pin when the thickness of the fluid medium is reduced, the other of said arms engaging said support means and retaining said transducer against the action of said bias means in a position away from the surface of said drum when the lever is pivoted in response to a decrease in the thickness of said fluid medium, said one arm maintaining the other of said arms disengaged from said transducer and said support means and allowing said transducer to float on a fluid medium adjacent to said drum when the drum is rotating.

7. Apparatus as recited in claim 6, further including a vane attached to said one arm, said vane coacting with and being responsive to the flow of said fluid medium.

References Cited by the Examiner

UNITED STATES PATENTS

| | | | |
|---|---|---|---|
| 2,862,781 | 12/58 | Baumeister | 179—100.2 |
| 3,005,676 | 10/61 | Best et al. | 179—100.2 |

IRVING L. SRAGOW, *Primary Examiner.*

ELI J. SAX, *Examiner.*

UNITED STATES PATENT OFFICE
CERTIFICATE OF CORRECTION

Patent No. 3,180,943 April 27, 1965

Johannes Franciscus Van Oort

It is hereby certified that error appears in the above numbered patent requiring correction and that the said Letters Patent should read as corrected below.

Column 1, line 30, strike out "film".

Signed and sealed this 2nd day of November 1965.

(SEAL)
Attest:

ERNEST W. SWIDER
Attesting Officer

EDWARD J. BRENNER
Commissioner of Patents